United States Patent
Fujii et al.

(10) Patent No.: US 8,234,041 B2
(45) Date of Patent: Jul. 31, 2012

(54) ELECTRIC POWER STEERING CONTROLLER

(75) Inventors: Takehito Fujii, Anjo (JP); Motoaki Kataoka, Kariya (JP); Kunihiko Chiba, Kuwana (JP); Daiji Watanabe, Chiryu (JP)

(73) Assignee: Denso Corporation, Kariya (JP)

( * ) Notice: Subject to any disclaimer, the term of this patent is extended or adjusted under 35 U.S.C. 154(b) by 866 days.

(21) Appl. No.: 12/288,503

(22) Filed: Oct. 21, 2008

(65) Prior Publication Data
US 2009/0112406 A1   Apr. 30, 2009

(30) Foreign Application Priority Data
Oct. 24, 2007  (JP) .................................. 2007-276832

(51) Int. Cl.
B62D 5/04 (2006.01)

(52) U.S. Cl. ............ 701/41; 701/43; 180/443; 180/444; 180/446

(58) Field of Classification Search .................... 701/41, 701/43; 180/443, 444, 446
See application file for complete search history.

(56) References Cited

U.S. PATENT DOCUMENTS

| | | | |
|---|---|---|---|
| 5,473,539 A | 12/1995 | Shimizu | |
| 5,698,956 A | 12/1997 | Nishino | |
| 6,640,923 B1 | 11/2003 | Dominke et al. | |
| 6,883,637 B2 | 4/2005 | Nishizaki et al. | |
| 6,999,862 B2 | 2/2006 | Tamaizumi et al. | |
| 2004/0140148 A1* | 7/2004 | Nishizaki et al. ............. | 180/443 |
| 2007/0017735 A1 | 1/2007 | Kataoka et al. | |

FOREIGN PATENT DOCUMENTS

| | | |
|---|---|---|
| JP | 01-095970 | 4/1989 |
| JP | 07-132839 | 5/1995 |
| JP | 08-282519 | 10/1996 |
| JP | 2007-022373 | 2/2007 |
| JP | 2007-253766 | 10/2007 |

OTHER PUBLICATIONS

Search Report dated Feb. 10, 2009 in European Patent Application No. 08018250.4.
Office action dated Nov. 17, 2009 in corresponding Japanese Application No. 2007-276832.

* cited by examiner

*Primary Examiner* — Lesley D Morris
*Assistant Examiner* — Michael Stabley
(74) *Attorney, Agent, or Firm* — Harness, Dickey & Pierce, PLC

(57) ABSTRACT

A correction value calculating section 70 is provided with a pinion shaft torsion angle correction value calculating section 74 and a pinion shaft torsion angular velocity correction value calculating section 75 for calculating a correction value in consideration with the transmission characteristic of the steering assist torque from the electric motor 6 to the steerable vehicle wheel 9. Therefore, the electric motor 6 can generate the steering assist torque compensating for the influence by the transmission characteristic of the steering assist torque from the electric motor 6 to the steerable vehicle wheel 9 by correcting a target value defined by a detection value of the torque sensor 3 with the correction value.

7 Claims, 7 Drawing Sheets

ELECTRIC POWER STEERING CONTROLLER

CROSS REFERENCE TO RELATED APPLICATIONS

The present application is based on Japanese Patent Application No. 2007-276832, filed on Oct. 24, 2007, the disclosure of which is incorporated herein by reference.

BACKGROUND OF THE INVENTION

1. Field of the Invention

The present invention relates to an electric power steering controller and more specifically to a controller for controlling an electric motor to generate steering assist torque.

2. Description of the Related Art

A conventional, electric power steering controller can compensate for inertia of an electric motor or a response delay of a transmission mechanism for transmitting the rotation of an electric motor to a steering shaft by, for example, using a differential output of a torque sensor.

The torque sensor for detecting a rotational force by sensing or detecting a torsion in a torsion bar is generally provided between a steering wheel and the electric motor in a conventional, electric power steering controller. Therefore, when compensating for the inertia of the electric motor by using only the differential output of the torque sensor, the inertia of the steering wheel increases in response to a steering velocity of the steering wheel, thereby causing an adverse influence such as an increase in an overshoot amount of the steering wheel.

In an electric power steering controller described in JP 8-282519A, a target current that should be supplied to the electric motor is determined from the output of the steering torque sensor and a phase compensation value is found from the output of the steering torque sensor and the rotational speed of the electric motor, thus correcting the target current with the phase compensation value. More specially, a value found by phase-compensating for the output of the steering torque sensor with the rotational speed of the electric motor is used to control the electric motor.

As described above, in the conventional, electric power steering controller, the phase delay of rotation of the electric motor to rotation of the steering wheel basically occurs due to torsion of the torsion bar and therefore, the electric motor is controlled so as to compensate for the phase delay.

However, detailed study has revealed that disadvantages are nonetheless present, since the steering assist torque generated by the electric motor is subject to an influence of transmission characteristics in a transmission system that transmits the steering assist torque from the electric motor to right and left front wheel tires. In particular, the steering assist torque is not immediately transmitted from the electric motor to the right and left front wheel tires due to systematic delay. That is, a steering torque transmission system includes a steering shaft, a rack shaft, tie rods and so on. A model of the transmission system includes a predetermined mass and spring elements. Delay in transmission of the steering assist torque is generated by the inertia based upon the mass or spring element or a combination thereof. Accordingly, even if the electric motor generates the steering assist torque in response to a steering input, the right and left front wheel tires are not immediately steered as intended. Thus, the transmission delay can cause an adverse influence on a steering feel and on a driving performance and turning performance of a vehicle.

SUMMARY OF THE INVENTION

The present invention is made in view of the foregoing problem and an object is to provide an electric power steering controller which can improve a driving performance or a steering feel of a vehicle.

In order to achieve the above object, an electric power steering controller according to a first aspect includes a steering torque sensor for detecting steering torque applied to a steering system from a steering wheel, an electric motor connected to the steering system to generate steering assist torque, target value calculating means that calculates a target value of the steering assist torque generated by the electric motor based upon the steering torque detected by the steering torque sensor, correction value calculating means that calculates a correction value of the steering assist torque based upon a transmission characteristic of the steering assist torque from the electric motor to a tire in the steering system, and control means that controls the steering assist torque generated by the electric motor so as to make the target value of the steering assist torque equal to a correction target value corrected by the correction value.

According to the aforementioned arrangement, the correction value calculating means calculates the correction value of the steering assist torque based upon the transmission characteristic from the electric motor to the tire in the steering system. The control means controls the steering assist torque generated by the electric motor so as to make the target value of the steering assist torque equal to the correction target value corrected by the correction value. As a result, the electric motor can generate the steering assist torque compensating for an influence by the transmission characteristic of the steering assist torque from the electric motor to the tire. Thus, an improvement of a driving performance and a steering feel of a vehicle can be achieved.

According to a second aspect, the correction value calculating means advantageously calculates a correction value for a difference between both the angles to be closer to zero when a relation between a rotational angle of the electric motor and a steering angle of the tire is converted into an angle in which both the angles can be compared. According to a third aspect, the correction value calculating means calculates a correction value for a difference between both the angular velocities to be closer to zero when a relation between a rotational angular velocity of the electric motor and a steering angular velocity of the tire is converted into an angular velocity in which both the angular velocities can be compared. The correction value necessary to moderate the influence of the transmission characteristic of the steering assist torque from the electric motor to the tire can be calculated.

Both of the correction values in accordance with the difference between both of the angles according to the second aspect and the correction value in accordance with the difference between both the angular velocities according to the third aspect may be found. According to a fourth aspect, a final correction value of the steering assist torque may be found by an addition of a first correction value calculated in accordance with the angle difference and a second correction value calculated in accordance with the angular velocity difference.

According to a fifth aspect, it is preferable that the steering system comprises first and second steering shafts which are connected through a torsion bar, the steering torque sensor detects a value in accordance with a difference in rotational angle between the first and second steering shafts as the steering torque applied from the steering wheel to the steering system, and the correction value calculating means is provided with a state estimating section which receives input of the steering assist torque generated by the electric motor and the value in accordance with the difference in rotational angle between the first and second steering shafts detected by the steering torque sensor to estimate a conversion angle difference in a case of converting the rotational angle of the electric motor and the steering angle of the tire into an angle in which both the angles can be compared. Such a state estimating section can estimate the angular difference between the rotational angle of the electric motor and the steering angle of the tire based upon the steering assist torque and the difference in rotational angle between the first and second steering shafts which are easily detectable by the sensors or the like.

According to a sixth aspect, it is preferable that the steering system comprises first and second steering shafts which are connected through a torsion bar, the steering torque sensor detects a value in accordance with a difference in rotational angle between the first and second steering shafts as the steering torque applied from the steering wheel to the steering system, and the correction value calculating means is provided with a state estimating section that receives input of the steering assist torque generated by the electric motor and the value in accordance with the angular difference in rotational angle between the first and second steering shafts detected by the steering torque sensor to estimate a conversion angular velocity difference in a case of converting the rotational angular velocity of the electric motor and the steering angular velocity of the tire into an angular velocity in which both the angular velocities can be compared. Such a state estimating section can estimate the angular velocity difference between the rotational angular velocity of the electric motor and the steering angular velocity of the tire based upon the steering assist torque and the difference in rotational angle between the first and second steering shafts.

According to a seventh aspect, the steering system comprises a steering shaft connected to the steering wheel, a rack shaft connected through a rack and pinion mechanism to the steering shaft to perform a linear motion in a right-left direction of a vehicle by rotation of the steering shaft, and a pair of tie rods each connecting both ends of the rack shaft to right and left tire wheels, wherein the electric motor may be connected to the steering shaft. According to an eighth aspect, the steering system comprises a steering shaft connected to the steering wheel, a rack shaft connected through a rack and pinion mechanism to the steering shaft to perform a linear motion in a right-left direction of a vehicle by rotation of the steering shaft, and a pair of tie rods each connecting both ends of the rack shaft to right and left tire wheels, wherein the electric motor may be connected to the rack shaft. Even in a case of adopting any of the above arrangements, a transmission system for transmitting the steering assist torque from the electric motor to the tire exists.

BRIEF DESCRIPTION OF THE DRAWINGS

Additional objects and advantages will be more readily apparent from the following detailed description of preferred embodiments when taken together with the accompanying drawings in which.

DETAILED DESCRIPTION OF THE EXEMPLARY EMBODIMENTS

First Embodiment

Figure 1:
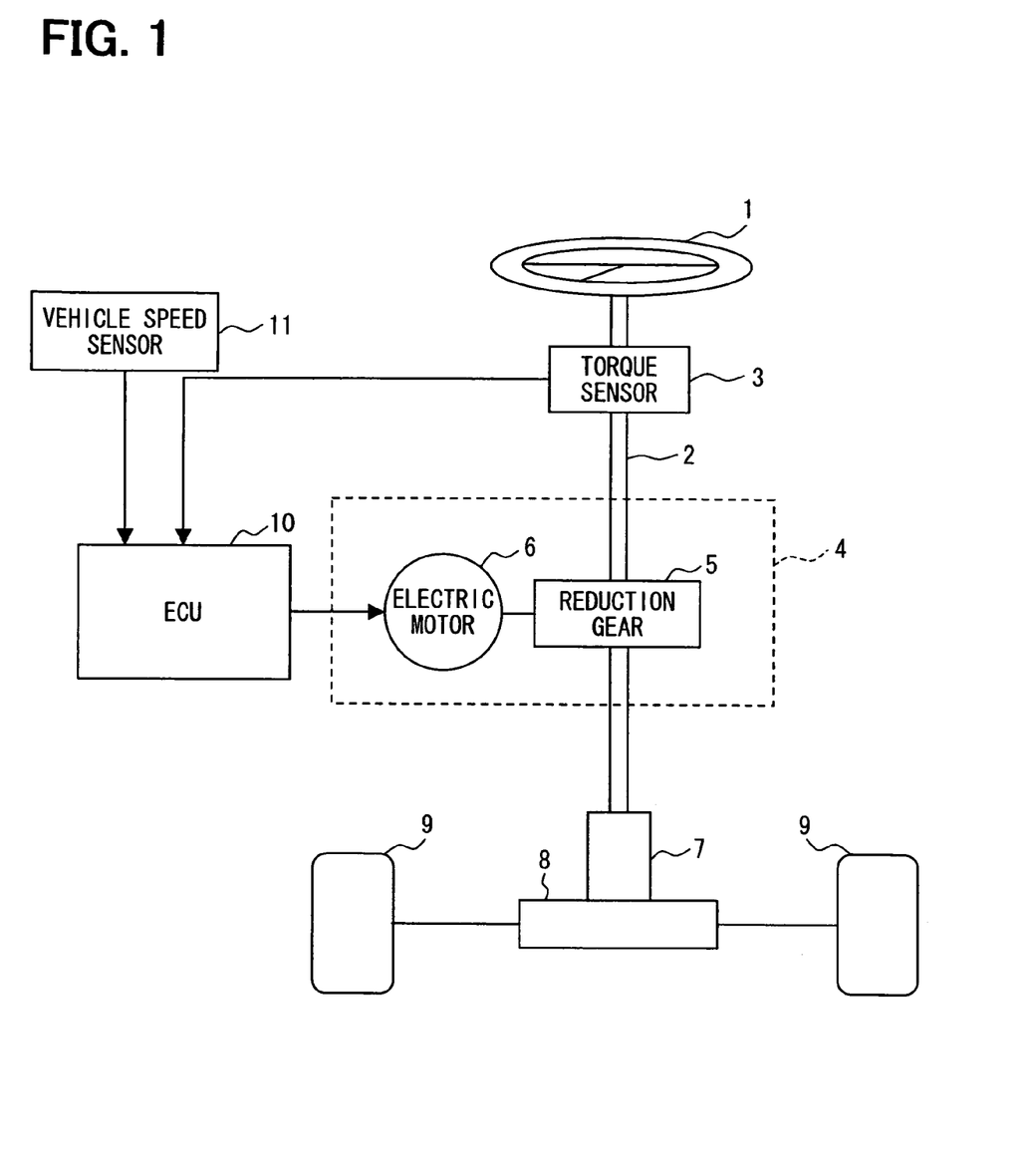
FIG. 1 is a diagram illustrating an exemplary construction of a steering system provided with an electric power steering (EPS) device controlled by an electric power steering controller according to a first embodiment.

Hereinafter, a first embodiment will be explained with reference to the drawings. FIG. 1 is a construction diagram showing an overall construction of a steering system provided with an electric power steering (EPS) device. The EPS device is a control object of an electric power steering controller according to the present embodiment.

In FIG. 1, a steering shaft 2 connected to a steering wheel 1 is provided with a torque sensor 3. The torque sensor 3 is provided with a torsion bar. The torque sensor detects a torsion angle of the torsion bar caused by a force associated with a steering torque applied to the steering wheel 1. That is, a rotational angle difference is generated between the upper and lower steering shafts 2 connected by the torsion bar. A value in accordance with the rotational angle difference is detected as the steering torque applied from the steering wheel 1 to the steering shaft 2. Further, the lower steering shaft 2 of the torsion bar is provided with an electric power steering device 4 providing steering assist torque for assisting a steering operation of a driver.

A tip of the steering shaft 2 is connected to a pinion shaft 7. The pinion shaft 7 is connected through a rack and pinion type gear mechanism to a rack shaft 8. Both ends of the rack shaft 8 are connected through tie rods or the like respectively to right and left vehicle wheels and to the ground through tires mounted on the wheels. The wheels and tires are referred to herein as steerable vehicle wheels 9. It should be noted however that, while a wheel and tire combination is typical in a vehicle steerable wheel, it is possible to model and thereby control other steerable wheel configurations. In consequence, when a rotational motion of the pinion shaft 7 is converted into a linear motion of the rack shaft 8, the right and left steerable vehicle wheels 9 are steered by an angle in accordance with the linear motion displacement of the rack shaft 8.

The electric power steering device 4 includes an electric motor 6 for generating steering assist torque and a reduction gear 5 for reducing rotation of the electric motor 6 and transmitting the reduced rotation to the steering shaft 2. In consequence, the electric power steering device 4 can transmit the steering assist torque in accordance with a steering direction and the steering torque of the steering wheel 1 by a drive of the electric motor 6, to the steering shaft 2.

The drive of the electric motor 6 is controlled by an electronic control unit (ECU) 10. The ECU 10 defines a target value of the steering assist torque which should be generated by the electric motor 6, based upon the steering torque detected by the torque sensor 3 and a vehicle speed detected by a vehicle speed sensor 11. The ECU 10, as described in detail later, calculates a correction value of the steering assist torque based upon a transmission characteristic of the steering assist torque from the electric motor 6 to the steerable vehicle wheel 9. Further, the ECU 10 controls the steering assist torque generated by the electric motor 6 so that the target value of the steering assist torque is equal to a correction target value corrected by the correction value.

Hereinafter, a method of calculating the correction value of the steering assist torque will be explained. In the present embodiment, a correction value of the steering assist torque in consideration of the transmission characteristic of the steering assist torque from the electric motor 6 to the steerable vehicle wheel 9 is calculated based upon a model shown in FIG. 2. Such a model is used because an angle difference in a case of respectively converting a rotational angle of the electric motor 6 and a rack stroke value, which is an amount of linear displacement of the rack shaft 8 in one direction or another, into rotational angles of the steering shaft or an angular velocity difference in a case of respectively converting a rotational angular velocity of the electric motor 6 and a rack stroke into rotational angular velocities of the steering shaft can be estimated by calculation of the detection value by the torque sensor 3 and the steering assist torque generated by the electric motor 6. The angle difference or the angular velocity difference corresponds to the transmission characteristic of the steering assist torque from the electric motor 6 to the steerable vehicle wheel 9.

Figure 2:
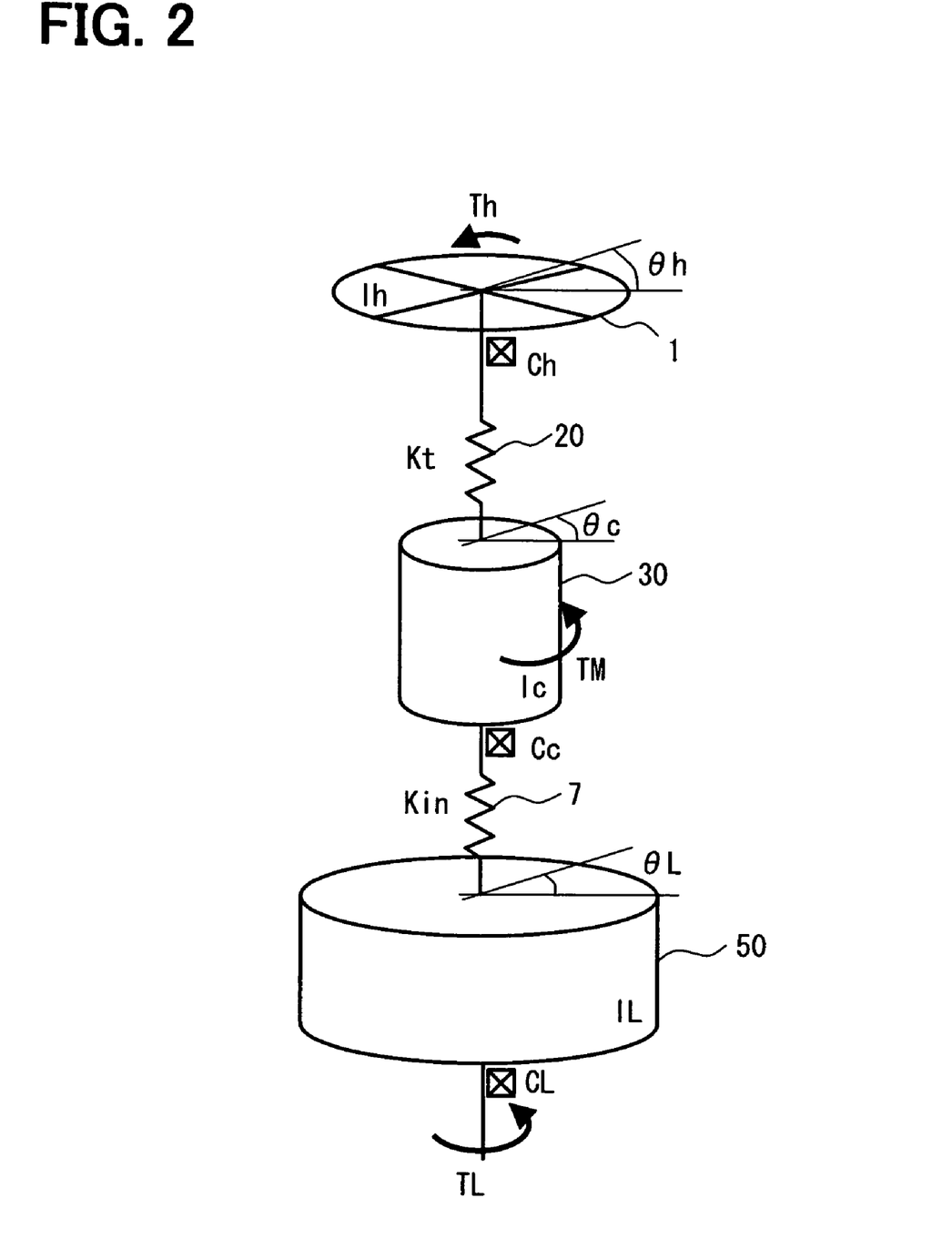
FIG. 2 is a diagram illustrating an exemplary model of a steering system.

First, the model shown in FIG. 2 will be explained. In FIG. 2, the steering wheel 1 has inertia mass Ih [kgm$^2$] and damping constant Ch [Nm·s/rad]. When the steering wheel 1 is steered, the steering wheel 1 is subject to a steering torque Th [Nm] to be rotated by a steering angle θh [rad].

A construction 20 corresponds to a torsion bar in the torque sensor 3. When the steering wheel 1 is steered, the torsion bar 20 is twisted and thereby generates a spring force for returning back to a state of being not twisted according to a torsion spring constant Kt [Nm/rad].

A construction 30 corresponds to a model construction whereby the electric motor 6 and the steering shaft 2 are joined. The construction 30 corresponds to a model construction formed by uniting the electric motor 6 and the steering shaft 2 and has inertia mass Ic [kgm$^2$] and damping constant Cc [Nm·s/rad]. It should be noted that the inertia mass corresponding to the electric motor 6 is converted into inertia mass in the steering shaft 2 for the purposed of the calculating. The construction 30 includes the electric motor 6 and therefore a torque TM [Nm] is exerted on the steering shaft 2 based on the rotation of the motor. The torque TM [Nm] generated by the electric motor 6 is also converted into torque of the steering shaft 2 for rotation thereof. Thereafter, θc, a rotational angle of the electric motor 6, is converted into a rotational angle of the steering shaft 2.

The pinion shaft 7 is also twisted more or less in a rotational direction as a resilient element in the same way with the torsion bar 20. Therefore, in FIG. 2, torsion spring constant of the pinion shaft 7 is shown as Kin [Nm/rad]. A construction 50 corresponds to a model construction formed by uniting from the rack shaft 8 connected to the pinion shaft 7 to the steerable vehicle wheel 9 The model construction 50 of the rack shaft 8 to the steerable vehicle wheel 9 has inertia mass IL [kgm$^2$] and damping constant CL [Nm·s/rad]. It should be noted that the inertia mass IL of the construction 50 is converted into inertia mass in the steering shaft 2 for calculation purposes. TL [Nm] is a value found by converting a lateral force associated with rack stroke, that is, a force that causes the rack shaft 8 to perform a linear motion, finally making the steerable vehicle wheel 9 be steered into rotational torque of the steering shaft 2. Further, a stroke of the rack shaft 8 is converted into a rotational angle of the steering shaft 2 and is shown as θL [rad].

Various motion equations can be expressed as follows EQ 1 with regard to the model construction 30 of the steering wheel 1, the electric motor 6 and the steering shaft 2, and the model construction 50 of the rack shaft 8 to the steerable vehicle wheel 9.

$$Ih \cdot \ddot{\theta}h = Th - Ch \cdot \dot{\theta}h - Kt(\theta h - \theta c)$$

$$Ic \cdot \ddot{\theta} = TM - Cc \cdot \dot{\theta} + Kt(\theta h - \theta c) - Kin(\theta c - \theta L)$$

$$IL \cdot \ddot{\theta}L = TL - CL \cdot \dot{\theta}L - Kin(\theta c - \theta L) \qquad (EQ\ 1)$$

When a torsion angle θt in the torsion bar 20=θh−θc, and a torsion angle θp in the pinion shaft 7=θc−θL, EQ 1 is changed into EQ 2 as follows.

$$\ddot{\theta}c = -\frac{Cc}{Ic} \cdot \dot{\theta}c + \frac{Kt}{Ic} \cdot \theta t - \frac{Kin}{Ic} \cdot \theta p + \frac{1}{Ic} \cdot TM \qquad (EQ\ 2)$$

$$\ddot{\theta}t = \left(\frac{Cc}{Ic} - \frac{Ch}{Ih}\right) \cdot \dot{\theta}c - \left(\frac{1}{Ic} + \frac{1}{Ih}\right) \cdot Kt \cdot \theta t -$$

$$\frac{Ch}{Ih} \cdot \dot{\theta}t + \frac{Kin}{Ic} \cdot \theta p + \frac{1}{Ih} \cdot Th - \frac{1}{Ic} \cdot TM$$

$$\ddot{\theta}p = \left(\frac{CL}{IL} - \frac{Cc}{Ic}\right) \cdot \dot{\theta}c - \frac{Kt}{Ic} \cdot \theta t - \left(\frac{1}{IL} + \frac{1}{Ic}\right) \cdot Kin \cdot \theta p -$$

$$\frac{CL}{IL} \cdot \dot{\theta}p + \frac{1}{Ic} \cdot TM - \frac{1}{IL} \cdot TL$$

The state equation shown in EQ 3 can be acquired as follows by arranging EQ 2.

$$\begin{pmatrix} \ddot{\theta}c \\ \theta t \\ \dot{\theta}t \\ \theta p \\ \dot{\theta}p \end{pmatrix} = \qquad (EQ\ 3)$$

$$\begin{pmatrix} -\frac{Cc}{Ic} & \frac{Kt}{Ic} & 0 & -\frac{Kin}{Ic} & 0 \\ 0 & 0 & 1 & 0 & 0 \\ \left(\frac{Cc}{Ic} - \frac{Ch}{Ih}\right) & -\left(\frac{1}{Ic} + \frac{1}{Ih}\right) \cdot Kt & -\frac{Ch}{Ih} & \frac{Kin}{Ic} & 0 \\ 0 & 0 & 0 & 0 & 1 \\ \left(\frac{CL}{IL} - \frac{Cc}{Ic}\right) & \frac{Kt}{Ic} & 0 & -\left(\frac{1}{IL} + \frac{1}{Ic}\right) \cdot Kin & -\frac{CL}{IL} \end{pmatrix}$$

$$\begin{pmatrix} \dot{\theta c} \\ \dot{\theta t} \\ \ddot{\theta t} \\ \dot{\theta p} \\ \ddot{\theta p} \end{pmatrix} + \begin{pmatrix} 0 & \frac{1}{Ic} & 0 \\ 0 & 0 & 0 \\ \frac{1}{Ih} & -\frac{1}{Ic} & 0 \\ 0 & 0 & 0 \\ 0 & \frac{1}{Ic} & -\frac{1}{IL} \end{pmatrix} \begin{pmatrix} Th \\ TM \\ TL \end{pmatrix}$$

The state equation of EQ 3 is described briefly as shown in EQ 4.

$$\dot{x} = Ax + Bu \tag{EQ 4}$$

Here, an angle difference that arises, for example, when converting a rotational angle of the electric motor 6 and a rack stroke respectively into rotational angles of the steering shaft 2. The difference corresponds to the transmission characteristic of the steering assist torque from the electric motor 6 to the steerable vehicle wheel 9. More specifically, when a torsion angle θp of the pinion shaft 7 is close to zero, a difference between a rotational angle of the electric motor 6 and a steering angle of the steerable vehicle wheel 9 can be made small. In consequence, when the electric motor 6 generates steering assist torque in accordance with a steering operation by a driver of a vehicle and rotates, the steerable vehicle wheel 9 is steered substantially in synchronization with the rotation of the electric motor 6. Therefore, a steering angle of the steerable vehicle wheel 9 is made more precisely in accordance with an intention of a driver, enabling a driving performance, or, more specifically, a turning performance or a steering feel of a vehicle to improve.

In the state equation for making the torsion angle θp of the pinion shaft 7 close to zero, an optimal regulator may be used to find control input u minimizing a performance function J as follows in EQ 5

$$J = \int \{\theta p^2 \cdot q + TM^2 \cdot r + (Th^2 + TL^2) \cdot s\} dt \tag{EQ 5}$$

When EQ 5 is expressed with a quadratic expression shown in EQ 6, a matrix (Q, R) in EQ 6 is as shown in EQ 7.

$$J = \int (x^T Q x + u^T R u) dt \tag{EQ 6}$$

$$Q = \begin{pmatrix} 0 & 0 & 0 & 0 & 0 \\ 0 & 0 & 0 & 0 & 0 \\ 0 & 0 & 0 & 0 & 0 \\ 0 & 0 & 0 & q & 0 \\ 0 & 0 & 0 & 0 & 0 \end{pmatrix} \tag{EQ 7}$$

$$R = \begin{pmatrix} s & 0 & 0 \\ 0 & r & 0 \\ 0 & 0 & s \end{pmatrix}$$

It should be noted that when s>>r in EQ 7, gains to Th and TL can be made negligible. Solution P of a Riccati equation shown in EQ 8 below is found from the matrix (Q, R) shown in EQ 7. The solution P is used to define control input u as shown in EQ 9, thereby making it possible to find the control input u minimizing the performance function 1, that is, a state feedback gain K.

$$PA + A^T P - PBR^{-1}B^T P + Q = 0 \tag{EQ 8}$$

$$u = -R^{-1}B^T Px \tag{EQ 9}$$
$$= -Kx$$

With regard to other state amounts, a position of weight q in the matrix Q is changed to perform the above calculation, thereby making it possible to find the control input u minimizing the performance function J. For example, as a parameter corresponding to the transmission function of the steering assist torque from the electric motor 6 to the steerable vehicle wheel 9, there is an angular velocity in a case of converting respectively a rotational angular velocity of the electric motor 6 and a rack stroke velocity into rotational angular velocities of the steering shaft 2, that is, a torsion angular velocity as a primary differential of a torsion angle θp of the pinion shaft 7. For making the angular velocity close to zero, (5, 5) component of the matrix Q may be made to weight q.

Here, for performing a state feedback control by control input u found by multiplying the state amount x by a feedback gain K, it is necessary that all of the state amounts are found. However, among the state amount, all of the state amounts are not found by a sensor or the like in the aforementioned construction. Therefore, in the present embodiment, the rest of the state amount is estimated by using an all-dimension observer matrix.

For example, in a case where it is possible to detect only the torsion angle θt of the torsion bar, for estimating the rest of the state amount using θt, first, an output equation is defined as EQ 10.

$$y = [0 \ 1 \ 0 \ 0 \ 0] x = Cx \tag{EQ 10}$$

Further, using the output equation of EQ 10 and the state equation of EQ 4, an estimation value $x_{\_est}$ of the state amount x is defined as EQ 11 as below.

$$\dot{x}_{\_est} = Ax_{\_est} + Bu + L(y - y_{\_est})$$

$$y_{\_est} = Cx_{\_est} \tag{EQ 11}$$

When the estimation value $x_{\_est}$ of the state amount x is defined as described above, a difference e between the estimation value $x_{\_est}$ and the state amount x can be represented in EQ 12 as below.

$$\dot{e} = \dot{x} - \dot{x}_{\_est} \tag{EQ 12}$$
$$= Ax + Bu - \{Ax_{\_est} + Bu + L(y - y_{\_est})\}$$
$$= (A - LC)e$$

Therefore, by appropriately defining L, the difference e between the estimation value $x_{\_est}$ and the state amount x is zero, that is, the estimation value $x_{\_est}$ is equal to the state amount x, so that it is possible to estimate a state amount that can not be detected by a sensor or the like.

Figure 3:
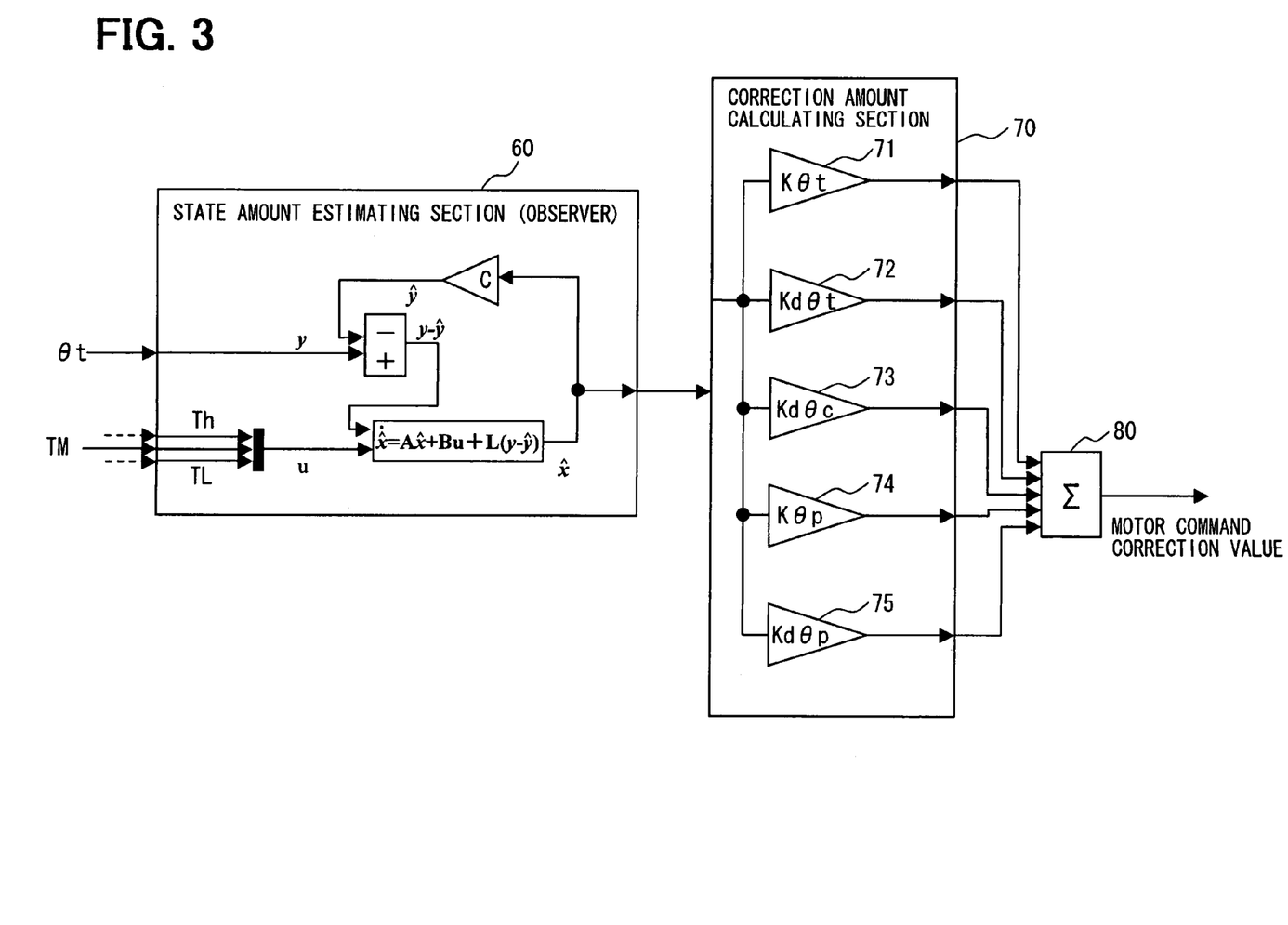
FIG. 3 is a control block diagram illustrating control blocks associated with calculating a correction value of steering assist torque in an electric power steering controller of a first embodiment.

FIG. 3 is a control block diagram for calculating a correction value of the steering assist torque. In FIG. 3, a state amount estimating section 60 is constructed of an all-dimension observer matrix and calculates an estimation value $x_{\_est}$ of the state amount x by receiving input of a torsion angle θt between the upper and lower steering shafts 2 of the torsion bar and torque TM generated by the electric motor 6.

Steering torque Th of the steering wheel 1 and a rack lateral force TL in addition to the motor generation torque TM may be inputted to the state amount estimating section 60. However, as described above, since the gains to Th and TL can be made negligible by appropriately setting the weight of the matrix R, Th and TL may be assumed as zero. In a case of inputting Th and TL, Th and TL may be detected by a sensor or the like or may be estimated by an observer matrix or the like.

The motor generation torque TM may be calculated from a detection value of a current value supplied to the electric motor 6 by a current sensor. In addition, the motor generation torque TM may be estimated from a current command value to the electric motor 6 or a torque sensor may be used to detect torque actually generated by the electric motor 6.

A correction amount calculating section 70 multiplies each parameter of the state amount x by each state feedback gain K found by using the aforementioned optimal regulator, thereby calculating optimal control input u, that is, a correction value of the steering assist torque. That is, the correction amount calculating section 70, as shown in FIG. 3, comprises a torsion bar torsion angle correction value calculating section 71 for calculating a correction value in accordance with a torsion angle of the torsion bar, a torsion bar torsion angular velocity correction value calculating section 72 for calculating a correction value in accordance with a torsion angular velocity of the torsion bar, a motor rotational velocity correction value calculating section 73 for calculating a correction value in accordance with a rotational velocity of the electric motor 6, a pinion shaft torsion angle correction value calculating section 74 for calculating a correction value in accordance with a torsion angle of the pinion shaft 7 and a pinion shaft torsion angular velocity correction value calculating section 75 for calculating a correction value in accordance with a torsion angular velocity of the pinion shaft 7. The correction values calculated respectively at the correction value calculating sections 71 to 75 are added at an additional section 80, which is outputted as a final correction value of the steering assist torque.

The present embodiment is provided with such a correction value calculating section 70, particularly with the pinion shaft torsion angle correction value calculating section 74 and the pinion shaft torsion angular velocity correction value calculating section 75 for calculating the correction value in consideration with the transmission characteristic of the steering assist torque from the electric motor 6 to the steerable vehicle wheel 9. Therefore, the electric motor 6 can generate the steering assist torque compensating for the influence by the transmission characteristic of the steering assist torque from the electric motor 6 to the steerable vehicle wheel 9.

Figure 4:
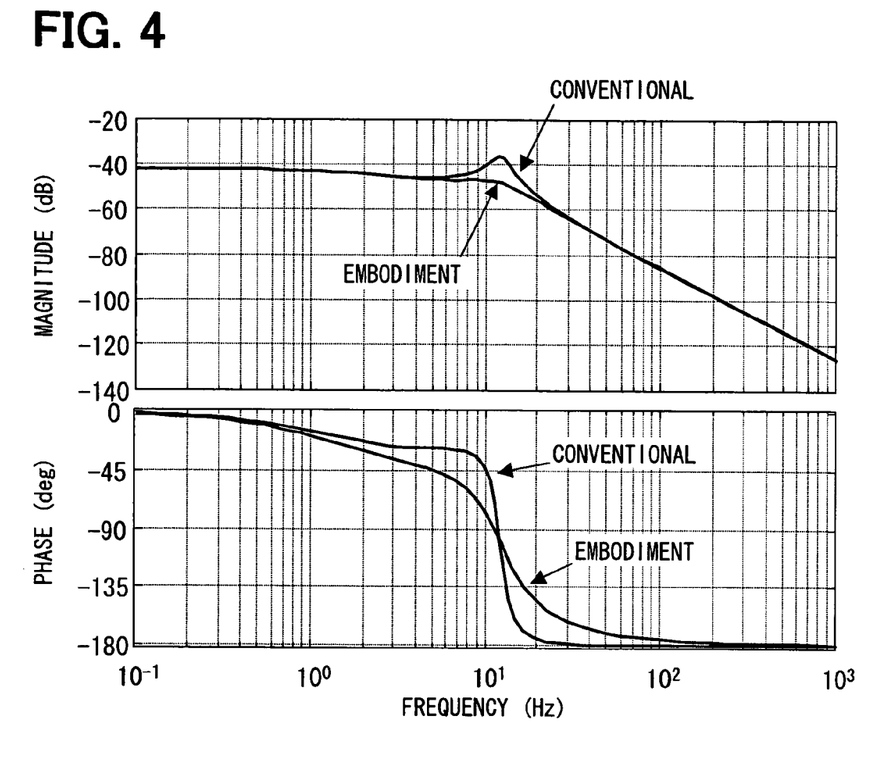
FIG. 4 is a graph illustrating a frequency characteristic when a pinion torsion angle θp changes upon occurrence of a change in motor generation torque TM.

FIG. 4 is a graph showing a frequency characteristic when a pinion torsion angle θp changes upon occurrence of a change in motor generation torque. As shown in FIG. 4, it is found out that, as compared to the conventional example of not considering the transmission characteristic of the steering assist torque from the electric motor 6 to the steerable vehicle wheel 9, a magnitude of a gain and a phase to the frequency both are smoothly changed in the present embodiment. Since the smooth change moderates an influence of the resonance characteristic in the transmission mechanism of the torque from the electric motor 6 to the steerable vehicle wheel 9 and the steerable vehicle wheel 9 is easily steered as an intention of a driver, a driving performance or a steering feel of a vehicle can be remarkably improved.

The present embodiment explains an example in which the correction value calculating section 70 is provided with both of the pinion shaft torsion angle correction value calculating section 74 and the pinion shaft torsion angular velocity correction value calculating section 75. However, the correction value calculating section 70 may be provided with one of the correction value calculating sections 74 and 75. As long as one of the correction value calculating sections 74 and 75 is provided, a correction value for compensating for the influence by the transmission characteristic of the steering assist torque from the electric motor 6 to the steerable vehicle wheel 9 can be calculated.

Second Embodiment

Next, a second embodiment will be explained with reference to the drawings. In a first embodiment, an example is described using a so-called column type EPS device in which the electric motor 6 generating the steering assist torque is connected to the steering shaft 2. The EPS is the control object of the electric power steering controller. However, the electric power steering controller may be also applied to a so-called rack type electric power steering device.

In accordance with a second embodiment, a model can be constructed as a basis for calculating a correction value of steering assist torque where the electric power steering controller is applied to a rack type electric power steering device.

Figure 5:
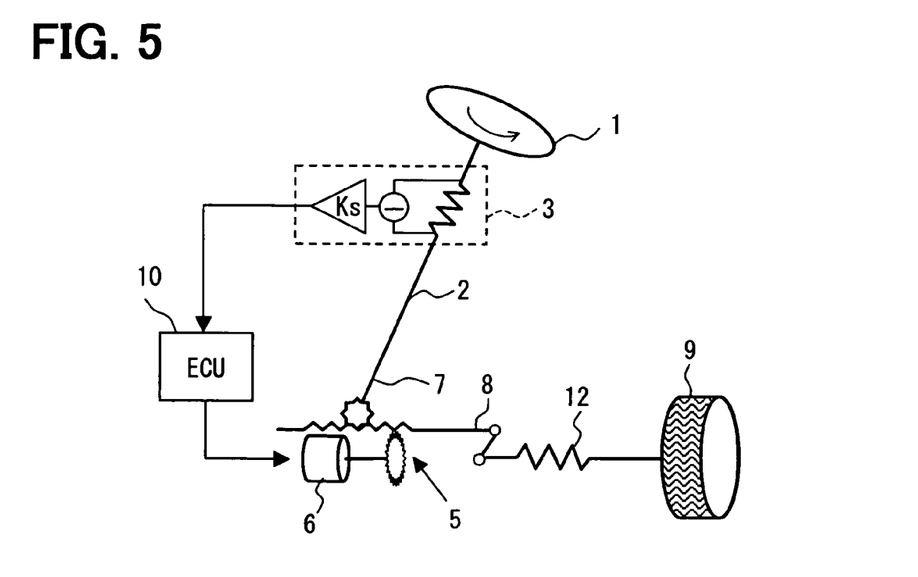
FIG. 5 is a diagram illustrating a rack type electric power steering device controlled by an electric power steering controller according to a second embodiment.

First, the rack type electric power steering device will be briefly explained. As shown in FIG. 5, a steering mechanism of the rack type electric power steering device has a construction similar to that of a steering mechanism of the column type electric power steering device except for a connection position of the electric motor 6. That is, the steering mechanism of the rack type electric power steering device is also provided with the steering wheel 1, the steering shaft 2, the torque sensor 3, the pinion shaft 7, the rack shaft 8, the tie rod 12 and the like.

However, the electric motor 6 is connected through the reduction gear 5 to the rack shaft 8. At this point, a gear attached to the output shaft of the electric motor 6 is meshed with a gear groove formed in a direction perpendicular to a longitudinal direction of the rack shaft 8. Since the gear groove includes plural grooves arranged along the longitudinal direction of the rack shaft 8, when the electric motor 6 rotates, the rack shaft 8 moves linearly in the right-left direction of a vehicle.

Figure 6:
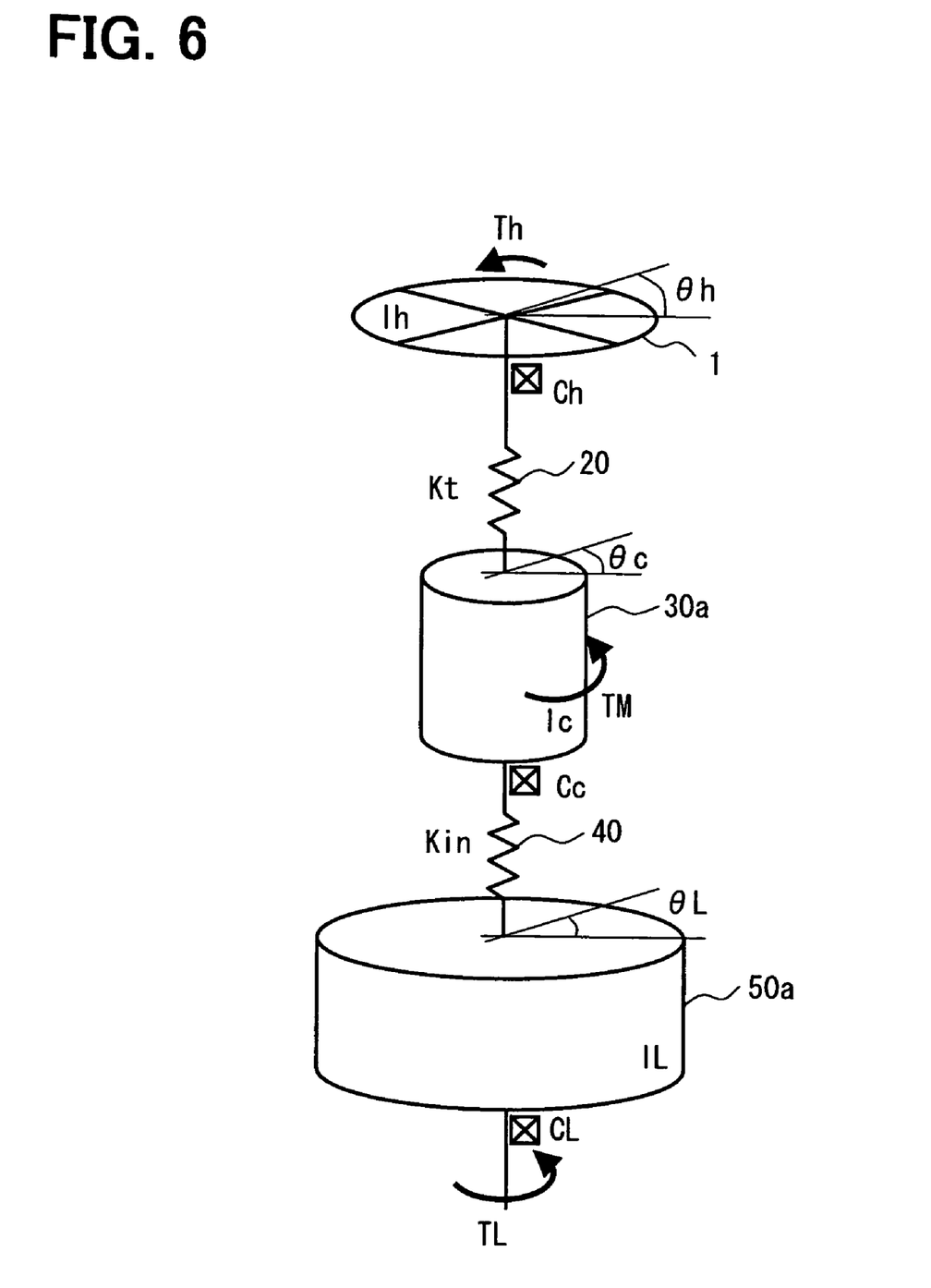
FIG. 6 is a diagram illustrating an exemplary model for calculating a correction value of steering assist torque in association with a rack type electric power steering device.

FIG. 6 is a model diagram for explaining the model which is a basis for calculating the correction value of the steering assist torque in a case of using the rack type electric power steering device as a control object. In FIG. 6, the steering wheel 1 and the torsion bar 20 are similar to those in the column type electric power steering device.

A construction 30a corresponds to the construction formed by visually uniting the electric motor 6 and the rack shaft 8. The model construction 30a of the electric motor 6 and the rack shaft 8 has inertia mass Ic [kgm$^2$] and damping constant Cc [Nm·s/rad]. It should be noted that inertia mass Ic corresponding to the electric motor 6 and the rack shaft 8 is converted into inertia mass in the steering shaft 2 for the calculating. Since the model construction 30a of the electric motor 6 and the rack shaft 8 includes the electric motor 6, the model construction 30a generates torque TM [Nm]. The torque TM [Nm] generated by the electric motor 6 is also converted into torque of the steering shaft 2.

A construction 40 corresponds to a rack and steering vehicle wheel connecting portion such as the tie rod 12 between the rack shaft 8 and the steerable vehicle wheel 9 or a bushing provided therebetween. Since the rack and steering vehicle wheel connecting portion 40 has also resilience, the spring constant is defined as Kin [Nm/rad]. A construction 50*a* corresponds to a wheel and a tire of the steerable vehicle wheel 9. The portion 50*a* corresponding to the wheel or the tire of the steerable vehicle wheel 9 has inertia mass IL [kgm$^2$] and damping constant CL [Nm·s/rad]. The inertia mass IL of the portion 50*a* is converted into inertia mass in the steering shaft 2 for the calculating. TL [Nm] is a value found by converting a lateral force applied to the wheel for steering the steerable vehicle wheel 9 into rotational torque of the steering shaft 2. Further, a steering angle of the steerable vehicle wheel 9 is converted into a rotational angle of the steering shaft 2 and is shown as θL [rad].

When the model is constructed as described above to set up motion equations in regard to the model construction 30*a* of the steering wheel 1, the electric motor 6 and the rack shaft 8, and the portion 50*a* corresponding to the wheel and the tire of the steerable vehicle wheel 9, the motion equations are completely the same as the motion equations shown in EQ 1. Therefore, even when the rack type EPS device is controlled, the correction value in consideration of the transmission characteristic of the steering assist torque from the electric motor 6 to the steerable vehicle wheel 9 can be calculated by the same method as that of a first embodiment.

Third Embodiment

Figure 7:
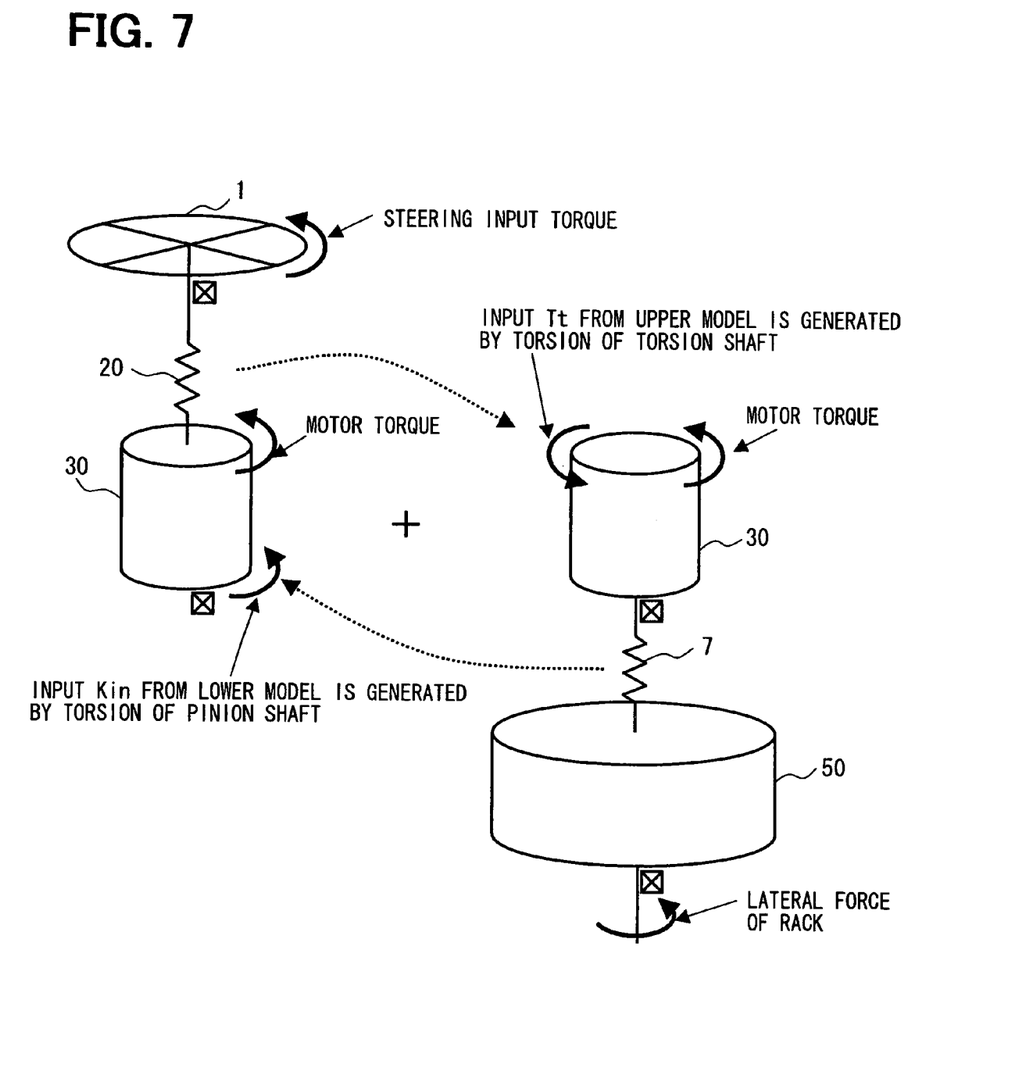
FIG. 7 is a diagram illustrating an exemplary upper model and an exemplary lower model of a steering system in a third embodiment.

In a first embodiment and a second embodiment, for example as described above, an entire steering system from the steering wheel 1 to the steerable vehicle wheel 9 is expressed by one model. In a third embodiment, however, the steering system is not expressed by one model, but, as shown in FIG. 7, the steering system is separated into two models based on the relationship between the steering system section and the electric motor 6. The model can be expressed by an upper model from the steering wheel 1 to the electric motor 6 and a lower model from the electric motor 6 to the steerable vehicle wheel 9. By separating the model into the upper model and the lower model, even in a case where a requirement for a behavior of the electric motor in the upper model is different from a requirement for a behavior of the electric motor in the lower model, the correction values in accordance with the respective requirements can be separately calculated. Since a degree of freedom in control of the steering assist torque generated by the electric motor is improved by thus using the separation model, more appropriate control can be performed. Hereinafter, a case of the column type electric power steering device in which the electric motor 6 is connected to the steering shaft 2 will be explained, but a case of the rack type electric power steering device is the same as a case of the column type electric power steering device without mentioning.

A motion equation in regard to the model construction 30 of the steering wheel 1, the electric motor 6 and the steering shaft 2 in the upper model is shown in EQ 13 as follows.

$$Ih \cdot \ddot{\theta}h = -Ch \cdot \dot{\theta}h - Kt(\theta h - \theta cu)$$

$$Ic \cdot \ddot{\theta}cu = TM + Tin - Cc \cdot \dot{\theta}cu + Kt(\theta h - \theta cu) \quad \text{(EQ 13)}$$

A rotational angle of the electric motor 6 in the upper model is represented as θcu. Torque inputted from the lower model to the upper model is represented as Tin.

When θh−θcu=θt, a state equation shown in EQ 14 can be acquired from the motion equation in EQ 13.

$$\begin{pmatrix} \dot{\theta}t \\ \ddot{\theta}t \\ \dot{\theta}cu \end{pmatrix} = \begin{pmatrix} 0 & 1 & 0 \\ -\left(\frac{1}{Ic}+\frac{1}{Ih}\right) \cdot Kt & -\frac{Ch}{Ih} & \left(\frac{Cc}{Ic}-\frac{Ch}{Ih}\right) \\ \frac{Kt}{Ic} & 0 & -\frac{Cc}{Ic} \end{pmatrix} \begin{pmatrix} \theta t \\ \dot{\theta}t \\ \theta cu \end{pmatrix} + \quad \text{(EQ 14)}$$

$$\begin{pmatrix} 0 & 0 \\ -\frac{1}{Ic} & -\frac{1}{Ic} \\ \frac{1}{Ic} & \frac{1}{Ic} \end{pmatrix} \begin{pmatrix} TM \\ Tin \end{pmatrix}$$

Likewise, the motion equation in regard to the lower model is shown in EQ 15 and the state equation is shown in EQ 16. The rotational angle of the electric motor 6 in the lower model is represented as θc1. Torque inputted from the upper model to the lower model is represented as Tt.

$$Ic \cdot \ddot{\theta}cl = TM + Tt - Cc \cdot \dot{\theta}cl - Kin(\theta cl - \theta L) \quad \text{(EQ 15)}$$
$$IL \cdot \ddot{\theta}L = -CL \cdot \dot{\theta}L + Kin(\theta cl - \theta L)$$

$$\begin{pmatrix} \dot{\theta}cl \\ \dot{\theta}p \\ \ddot{\theta}p \end{pmatrix} = \begin{pmatrix} -\frac{Cc}{Ic} & -\frac{Kin}{Ic} & 0 \\ 0 & 0 & 1 \\ \left(\frac{CL}{IL}-\frac{Cc}{Ic}\right) & -\left(\frac{1}{IL}+\frac{1}{Ic}\right) \cdot Kin & -\frac{CL}{IL} \end{pmatrix} \begin{pmatrix} \theta cl \\ \theta p \\ \dot{\theta}p \end{pmatrix} + \quad \text{[EQ 16]}$$

$$\begin{pmatrix} 0 & 0 \\ \frac{1}{Ic} & \frac{1}{Ic} \\ \frac{1}{Ic} & \frac{1}{Ic} \end{pmatrix} \begin{pmatrix} Tt \\ TM \end{pmatrix}$$

A state feedback gain K in regard to each of the upper model and the lower model is found using a method similar to the method of the first embodiment, based upon the state equation as described above.

Figure 8:
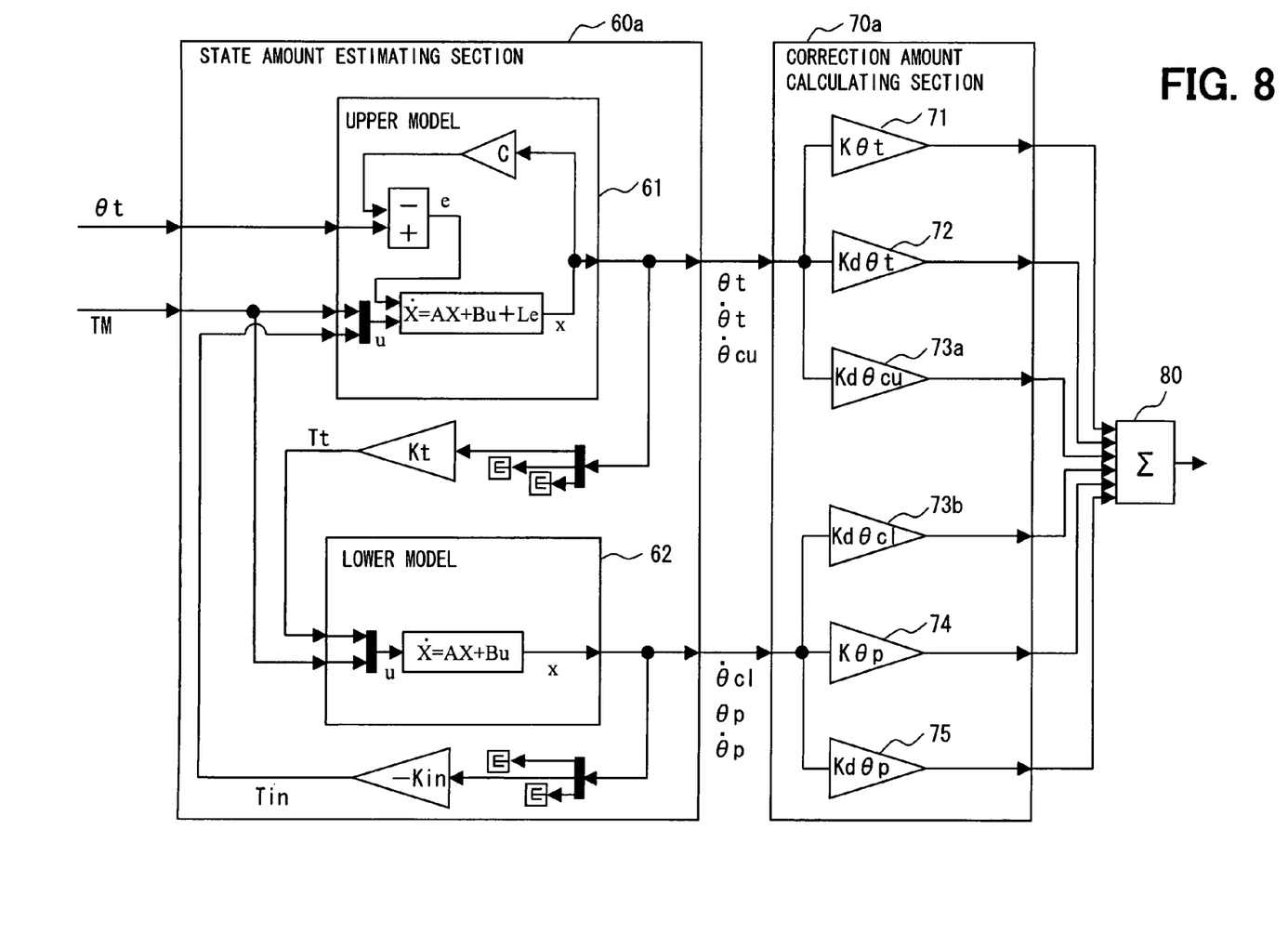
FIG. 8 is a control block diagram control blocks associated with calculating a correction value of steering assist torque in the electric power steering controller of a third embodiment.

FIG. 8 is a control block diagram for calculating a correction value of the steering assist torque in the present embodiment. In FIG. 8, a state amount estimating section 60A comprises an upper model estimating section 61 and a lower model estimating section 62. Since the upper model estimating section 61 is capable of observing a torsion angle θt of the torsion bar, the upper model estimating section 61 uses the all-dimension observer matrix. On the other hand, since there is no state amount which can be observed in a case of the lower model estimating section 62, estimating values of all state amounts are calculated by giving only the control input u to the model.

As described above, for inputting the torque Tt from the upper model estimating section 61 to the lower model estimating section 62, the torque Tt is found by multiplying the torsion angle θt of the torsion bar by a predetermined gain Kt among the state amount x outputted from the upper model estimating section 61 and is inputted to the lower model estimating section 62. In contrast, for inputting the torque Tin from the lower model estimating section 62 to the upper model estimating section 61, the torque Tin is found by multiplying the torsion angle θp of the pinion shaft 7 by a predetermined gain −Kin among the state amount x outputted from the lower model estimating section 62 and is inputted to the upper model estimating section 61.

A correction amount calculating section 70A multiplies each parameter of the state amounts x outputted from the upper model estimating section 61 and the lower model estimating section 62 by the state feedback gain K to calculate a correction value of the steering assist torque. The construction of the correction amount calculating section 70A is substantially the same as the construction of the correction amount calculating section 70 in a first embodiment, but differs in a point of being provided with a motor rotational velocity correction value calculating section 73A for calculating a correction value in accordance with a rotational velocity of the electric motor 6 outputted from the upper model estimating section 61 and a motor rotational velocity correction value calculating section 73B for calculating a correction value in accordance with a rotational velocity of the electric motor 6 outputted from the lower model estimating section 62.

Since the upper model estimating section and the lower model estimating section, are provided for calculating the correction value in accordance with the rotational velocity of the electric motor 6, the correction values can be provided so as to independently meet requirements of respective upper and lower sections.

What is claimed is:

1. An electric power steering controller comprising:
a steering torque sensor detecting a steering torque applied to a steering system from a steering wheel;
an electric motor connected to the steering system to generate a steering assist torque;
means for calculating a target value of the steering assist torque generated by the electric motor, based upon the steering torque detected by the steering torque sensor;
means for calculating a correction value of the steering assist torque based upon a transmission characteristic of the steering assist torque from the electric motor to a tire; and
means for controlling the steering assist torque generated by the electric motor so as to make the target value of the steering assist torque equal to a correction target value corrected by the correction value; wherein
the means for calculating the correction value calculates a correction value for a difference between a rotational angular velocity of the electric motor and a steering angular velocity of the tire to be closer to zero when a relation between the rotational angular velocity and the steering angular velocity is converted into an angular velocity in which both the rotational angular velocity and the steering angular velocity can be compared.

2. An electric power steering controller according to claim 1, wherein:
the steering system comprises first and second steering shafts connected through a torsion bar;
the steering torque sensor detects a value in accordance with a difference in rotational angle between the first and second steering shafts as the steering torque applied from the steering wheel to the steering system; and
the means for calculating the correction value includes a state estimating section that receives input of the steering assist torque generated by the electric motor and the value in accordance with the difference in rotational angle between the first and second steering shafts detected by the steering torque sensor to estimate a conversion angular velocity difference in a case of converting the rotational angular velocity of the electric motor and the steering angular velocity of the tire into an angular velocity in which both the angular velocities can be compared.

3. An electric power steering controller comprising:
a steering torque sensor detecting a steering torque applied to a steering system from a steering wheel;
an electric motor connected to the steering system to generate a steering assist torque;
means for calculating a target value of the steering assist torque generated by the electric motor, based upon the steering torque detected by the steering torque sensor;
means for calculating a correction value of the steering assist torque based upon a transmission characteristic of the steering assist torque from the electric motor to a tire; and
means for controlling the steering assist torque generated by the electric motor so as to make the target value of the steering assist torque equal to a correction target value corrected by the correction value; wherein
the means for calculating the correction value:
calculates a first correction value for a difference between a rotational angle of the electric motor and a steering angle of the tire to be closer to zero when a relation between the rotational angle and the steering angle is converted into an angle in which the rotational angle and the steering angle can be compared;
and calculates a second correction value for a difference between both of the angular velocities to be closer to zero, wherein the first correction value and the second correction value are added to calculate a correction value of the steering assist torque when a relation between the rotational angular velocity and the steering angular velocity is converted into an angular velocity in which the rotational angular velocity and the steering angular velocity can be compared.

4. An electric power steering controller comprising:
a steering torque sensor detecting a steering torque applied to a steering system from a steering wheel;
an electric motor connected to the steering system to generate a steering assist torque;
means for calculating a target value of the steering assist torque generated by the electric motor, based upon the steering torque detected by the steering torque sensor;
means for calculating a correction value of the steering assist torque based upon a transmission characteristic of the steering assist torque from the electric motor to a tire; and
means for controlling the steering assist torque generated by the electric motor so as to make the target value of the steering assist torque equal to a correction target value corrected by the correction value; wherein
the means for calculating the correction value is further for calculating a correction value for a difference between a rotational angle of the electric motor and a steering angle of the tire to be closer to zero, when a relation between both the angles is converted into an angle to which both the angles can be compared; and
the steering system includes a first steering shaft and a second steering shafts connected through a torsion bar;
the steering torque sensor detects a value in accordance with a difference in rotational angle between the first and second steering shafts as the steering torque applied from the steering wheel to the steering system; and
the means for calculating the correction value includes a state estimating section that receives input of the steering assist torque generated by the electric motor and the value in accordance with the difference in rotational angle between the first and second steering shafts detected by the steering torque sensor to estimate a conversion angle difference in a case of converting the rotational angle of the electric motor and the steering angle of the tire into an angle in which both the angles can be compared.

5. An electric power steering (EPS) controller controlling an EPS device in a steering system of a vehicle, the EPS device including an electric motor mounted on the steering system and a transmission transmitting a steering assist torque from the electric motor to the steering system, the steering assist torque assisting the movement of a steerable portion of the vehicle to a target steering angle, the EPS controller comprising:

a steering torque sensor detecting a steering torque applied to the steering system from a steering wheel as a steering wheel angle to achieve the target steering angle;

means for calculating a target value of the steering assist torque based on the steering torque;

a correction value calculating section configured to:
convert an actual steering angle of the steerable portion into a first angle of the steering shaft;
convert the target value of the steering assist torque into a target angle of the steering shaft; and
calculate a correction value of the steering assist torque based on a characteristic when the steering assist torque is transmitted from the electric motor to the steerable portion of the vehicle, the characteristic including one or more of a spring constant, a damping constant, and an inertial mass of one or more components in the steering system; and means for controlling the steering assist torque generated by the electric motor using the correction value so as to make the target value of the steering assist torque equal to a corrected target value such that the first angle of the steering shaft corresponds to the target angle of the steering shaft; wherein the correction value calculating section is further configured to:
convert a first linear velocity associated with a change in the actual steering angle to a first angular velocity of the steering shaft;
convert a rotational angular velocity of the electric motor associated with generating the target value of the steering assist torque into a second steering shaft angular velocity; and
calculate the correction value such that a difference between the first steering shaft angular velocity and the second steering shaft angular velocity is reduced to approximately zero.

6. An electric power steering (EPS) controller controlling an EPS device in a steering system of a vehicle, the EPS device including an electric motor mounted on the steering system and a transmission transmitting a steering assist torque from the electric motor to the steering system, the steering assist torque assisting the movement of a steerable portion of the vehicle to a target steering angle, the EPS controller comprising:

a steering torque sensor detecting a steering torque applied to the steering system from a steering wheel as a steering wheel angle to achieve the target steering angle;

means for calculating a target value of the steering assist torque based on the steering torque;

a correction value calculating section configured to:
convert an actual steering angle of the steerable portion into a first angle of the steering shaft;
convert the target value of the steering assist torque into a target angle of the steering shaft; and
calculate a correction value of the steering assist torque based on a characteristic when the steering assist torque is transmitted from the electric motor to the steerable portion of the vehicle, the characteristic including one or more of a spring constant, a damping constant, and an inertial mass of one or more components in the steering system; and means for controlling the steering assist torque generated by the electric motor using the correction value so as to make the target value of the steering assist torque equal to a corrected target value such that the first angle of the steering shaft corresponds to the target angle of the steering shaft; wherein the correction value includes a first correction value and a second correction value, and wherein the correction value calculating section is further configured to:
convert a rotational angle of the electric motor associated with generating the target value of the steering assist torque into a second angle of the steering shaft;
convert a first linear velocity associated with a change in the actual steering angle to a first angular velocity of the steering shaft;
convert a rotational angular velocity of the electric motor associated with generating the target value of the steering assist torque into a second steering shaft angular velocity; and
calculate the first correction value such that a first difference between the first angle of the steering shaft and the second angle of the steering shaft is reduced to approximately zero and calculate the second correction value such that a second difference between the first angular velocity of the steering shaft and the second angular velocity of the steering shaft is reduced to approximately zero.

7. An electric power steering (EPS) controller controlling an EPS device in a steering system of a vehicle, the EPS device including an electric motor mounted on the steering system and a transmission transmitting a steering assist torque from the electric motor to the steering system, the steering assist torque assisting the movement of a steerable portion of the vehicle to a target steering angle, the EPS controller comprising:

a steering torque sensor detecting a steering torque applied to the steering system from a steering wheel as a steering wheel angle to achieve the target steering angle;

means for calculating a target value of the steering assist torque based on the steering torque;

a correction value calculating section configured to:
convert an actual steering angle of the steerable portion into a first angle of the steering shaft;
convert the target value of the steering assist torque into a target angle of the steering shaft; and
calculate a correction value of the steering assist torque based on a characteristic when the steering assist torque is transmitted from the electric motor to the steerable portion of the vehicle, the characteristic including one or more of a spring constant, a damping constant, and an inertial mass of one or more components in the steering system; and means for controlling the steering assist torque generated by the electric motor using the correction value so as to make the target value of the steering assist torque equal to a corrected target value such that the first angle of the steering shaft corresponds to the target angle of the steering shaft; further comprising a state estimating section coupled to the correction value calculating section, wherein:

the torque sensor includes a torsion bar;

the steering shaft includes a lower steering section and an upper steering section coupled by the torsion bar;

the correction value calculating section is further configured to convert a rotational angle of the electric motor associated with generating the target value of the steering assist torque into a torque assist angle; and the state estimating section includes:

an upper estimation section including an all-observer matrix, the upper estimating section receiving a first upper input of a torsion angle of the torsion bar, a second upper input of a torque of the electric motor, a third upper input of a controlled quantity, and a first quantity of the characteristic associated with the lower steering section, the upper estimation section generating a first state output; and a lower estimation section including a first lower input of the torque of the electric motor, a second quantity of the characteristic associated with the upper steering section, and a second lower input of the controlled quantity, the lower estimation section generating a second state output, wherein the first state output and the second state output are input to the correction value calculating section for generating the correction value.

* * * * *